(12) United States Patent
Gentile et al.

(10) Patent No.: US 11,379,669 B2
(45) Date of Patent: Jul. 5, 2022

(54) IDENTIFYING AMBIGUITY IN SEMANTIC RESOURCES

(71) Applicant: International Business Machines Corporation, Armonk, NY (US)

(72) Inventors: Anna Lisa Gentile, San Jose, CA (US); Anni R. Coden, Bronx, NY (US); Ismini Lourentzou, Urbana, IL (US); Daniel Gruhl, San Jose, CA (US); Chad Eric DeLuca, Morgan Hill, CA (US); Petar Ristoski, San Jose, CA (US); Linda Ha Kato, San Jose, CA (US); Chris Kau, Mountain View, CA (US); Steven R. Welch, Gilroy, CA (US); Alfredo Alba, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 255 days.

(21) Appl. No.: 16/524,818

(22) Filed: Jul. 29, 2019

(65) Prior Publication Data
US 2021/0034704 A1    Feb. 4, 2021

(51) Int. Cl.
*G06F 40/242* (2020.01)
*G06F 40/279* (2020.01)
*G06F 40/30* (2020.01)

(52) U.S. Cl.
CPC ............ *G06F 40/30* (2020.01); *G06F 40/242* (2020.01)

(58) Field of Classification Search
CPC ...... G06F 40/20; G06F 40/237; G06F 40/242; G06F 40/279; G06F 40/284; G06F 40/289; G06F 40/30

USPC .............................................. 704/1, 8, 9, 10
See application file for complete search history.

(56) References Cited

U.S. PATENT DOCUMENTS

| | | | | |
|---|---|---|---|---|
| 5,181,163 | A * | 1/1993 | Nakajima ............. | G06F 40/242 704/10 |
| 7,630,982 | B2 * | 12/2009 | Boyce ................. | G06F 16/2458 |
| 9,460,078 | B2 | 10/2016 | Dwarakanath et al. | |
| 9,483,460 | B2 * | 11/2016 | Bedrax-Weiss ....... | G06F 40/242 |
| 9,575,954 | B2 | 2/2017 | Cougias et al. | |

(Continued)

OTHER PUBLICATIONS

Kurahashi et al., "KN Parser: Japanese Dependency/Case Structure Analyzer", Proceedings of the Workshop on Sharable Natural Language Resources, 1994, pp. 48 to 55. (Year: 1994).*

(Continued)

*Primary Examiner* — Martin Lerner
(74) *Attorney, Agent, or Firm* — Lieberman & Brandsdorfer, LLC

(57) ABSTRACT

Embodiments relate to a system, program product, and method for dictionary membership management directed at identifying ambiguity in semantic resources. A dictionary of seed terms is applied to a text corpus and matching items in the corpus are identified. The linguistic properties for each matching item are characterized and a context pattern of each matching item is constructed. Each context pattern is applied to the dictionary and matching content between the seed terms and the context pattern is identified and quantified. Lexicon items from the dictionary that have anomalous behavior reflected in the quantification are identified. One or more seed words identified as having anomalous behavior are selectively removed from the dictionary.

20 Claims, 7 Drawing Sheets

(56) References Cited

U.S. PATENT DOCUMENTS

| | | | |
|---|---|---|---|
| 9,588,963 | B2 | 3/2017 | Williams et al. |
| 2005/0234709 | A1* | 10/2005 | Klavans ............... G06F 40/242 704/10 |
| 2006/0129531 | A1* | 6/2006 | Bates .................... G06F 16/951 |
| 2007/0118357 | A1* | 5/2007 | Kasravi .................. G06F 40/30 704/10 |
| 2008/0312911 | A1* | 12/2008 | Zhang ................... G06F 40/242 704/10 |
| 2010/0168994 | A1* | 7/2010 | Bourque ............ G01C 21/3617 701/532 |
| 2012/0310944 | A1* | 12/2012 | Mizuguchi ........... G06F 40/242 707/740 |
| 2013/0318076 | A1* | 11/2013 | Chiticariu ............. G06F 40/242 707/723 |
| 2014/0163966 | A1 | 6/2014 | Dwarakanath et al. |
| 2014/0288924 | A1* | 9/2014 | Goud .................... G06F 40/242 704/10 |
| 2015/0106082 | A1* | 4/2015 | Ge .......................... G06F 40/40 704/10 |
| 2015/0221300 | A1* | 8/2015 | Sukhomlinov ....... G06F 40/242 704/246 |
| 2015/0363384 | A1 | 12/2015 | Williams et al. |
| 2016/0092435 | A1* | 3/2016 | Clarkson ............... G06F 40/242 704/10 |
| 2016/0246780 | A1* | 8/2016 | Feller .................... G06F 40/242 |
| 2016/0292237 | A1* | 10/2016 | Sato ....................... G06F 16/245 |
| 2016/0306789 | A1 | 10/2016 | Cougias et al. |
| 2017/0286398 | A1 | 10/2017 | Hunt et al. |
| 2018/0113867 | A1* | 4/2018 | Erpenbach .............. G06F 40/10 |
| 2019/0362003 | A1* | 11/2019 | Zhang .............. G06F 16/24535 |

OTHER PUBLICATIONS

Alba, A., et al.. Multi-lingual Concept Extraction with Linked Data and Human-in-the-Loops, K-CAP 2017, pp. 24:1-24:8, Association for Computing Machinery, Dec. 4-6, 2017.

Arora, S., et al., Linear Algebraic Structure of Word Senses, with Applications to Polysemy, Transactions of the Association for Computational Linguistics, vol. 6, pp. 483-495, Jul. 2018.

Baroni, M. et al.. The WaCky Wide Web: A Collection of Very Large Linguistically Processed Web-Crawled Corpora, Oct. 11, 2008.

Bartunov, S., et al., Breaking Sticks and Ambiguities with Adaptive Skip-gram, Proceedings of the 19th International Conference on Artificial Intelligence and Statistics (AISTATS) 2016, pp. 130-138.

Bontcheva, K., et al., TwitIE: An Open-Source Information Extraction Pipeline for Microblog Text, Proceedings of Recent Advances in Natural Language Processing, pp. 83-90, Sep. 2013.

Chen, X., et al., A Unified Model for Word Sense Representation and Disambiguation, Proceedings of the 2014 Conference on Empirical Methods in Natural Language Processing (EMNLP), oo. 1025-1035, Oct. 2014.

Coden, Anni, et al., SPOT the drug! An unsupervised pattern matching method to extract drug names from very large clinical corpora, 2012 IEEE Second Conference on Healthcare Informatics, Imaging and Systems Biology, pp. 33-39, 2012.

Collins, M., et al., Learning Dictionaries for Named Entity Recognition using Minimal Supervision, Proceedings of the 14th Conference of the European Chapter of the Association for Computational Linguistics, pp. 452-461, Apr. 2014.

Cook, H., et al., A dictionary-and rule-based system for identification of bacteria and habitats in text, Proceedings of the 4th BioNLP Shared Text Workshop, pp. 50-55, Aug. 2016.

Ferraresi, A., et al., Introducing and evaluating ukWaC, a very large web-derived corpus of English, pp. 47-54, 2008.

Firth, J.R., A Synopsis of Linguistic Theory, 1930-1955: Studies in Linguistic Analysis, 1962. (18 Pages).

Gentile, A., et al., Unsupervised Wrapper Induction using Linked Data, K-CAP 2013, pp. 41-48, Association for Computing Machinery, Jun. 23-26, 2013.

Gorrell, G., et al., Using ©Twitter Conventions to Improve #LOD-based Named Entity Disambiguation, ESWC Jun. 2015, pp. 171-186.

Iacobacci, I., et al., Embeddings for Word Sense Disambiguation: An Evaluation Study, Proceedings of the 54th Annual Meeting of the Association for Computational Linguistics, pp. 897-907, Aug. 7-12, 2016.

Janowicz, K., et al., Moon Landing or Safari? A Study of Systematic Errors and Their Causes in Geographic Linked Data, GIScience 2016, pp. 275-290.

Jezek, E., et al., Distributional Analysis of Copredication: Towards Distinguishing Systematic Polysemy from Coercion, pp. 219-223, 2015.

Lin, Dekang, Automatic Retrieval and Clustering of Similar Words, COLING 1998, pp. 768-774.

Liu, X., et al., Joint Inference of Named Entity Recognition and Normalization for Tweets, Proceedings of the 50th Annual Meeting of the Association for Computational Linguistics, pp. 526-535, Jul. 8-14, 2012.

McCarthy, D., et al.. Finding Predominant Word Senses in Untagged Text, 2002. (8 Pages).

Melo, A., et al., Detection of Relation Assertion Errors in Knowledge Graphs, K-CAP, Jul. 2017. (5 Pages).

Mihalcea, R., et al., PageRank on Semantic Networkds, with Application to Word Sense Disambiguation, 2004. (7 Pages).

Mikolov, Tomas, et al.. Distributed Representations of Words and Phrases and their Compositionality, Advances in neural information processing systems, pp. 3111-3119, 2013.

Miller, G., WordNet: A Lexical Database for English, Communicaitons of the ACM, vol. 38, No. 11, pp. 39-41, Nov. 1995.

Mintz, M., et al.. Distant Supervision for Relation Extraction Without Labeled Data, Proceedings of the 47th Annual Meeting of the ACL and the 4th IJCNLP of the AFNLP, pp. 1003-1011, Aug. 2-7, 2009.

Navigli, R., Word Sense Disambiguation: A Survey, ACM Comput. Surv., 41, 2, Article 10, Feb. 2009, pp. 1-69.

Navigli, R., A Quick Tour of Word Sense Disambiguation, Induction and Related Approaches, SOFSEM 2012, pp. 115-129.

Navigli, R., et al.. An Experimental Study of Graph Connectivity for Unsupervised Word Sense Disambiguation, IEEE Transactions on Pattern Analysis and Machine Intelligence, 32(4), pp. 678-692, Apr. 2010.

Neelakantan, A., et al.. Learning Dictionaries for Named Entity Recognition Using Minimal Supervision, Proceedings of the 14th Conference of the European Chapter of the Association for Computational Linguistics, pp. 452-461, Apr. 26-30, 2014.

Pafilis, E., et al., ENVIRONMENTS and EOL: identification of Environment Ontology terms in text and the annotation of the Encyclopedia of Life, Bioinformatics, 31(111), pp. 1872-1874, 2015.

Pletscher-Franklid, S., et al., DISEASES: Text Mining and Data Integration of Disease-Gene Associations, Methods Mar. 2015, vol. 74, pp. 83-89.

Ponzetto, S., et al., Knowledge-richWordSenseDisambiguationRivalingSupervisedSystems, Proceedings of the 48th Annual Meeting of the Association for Computational Linguistics, pp. 1522-1531, Jul. 11-16, 2010.

Rocktaschel, T., et al., ChemSpot: a hybrid system for chemical named entity recognition, col. 28, No. 12, 2012, pp. 1633-1640.

Song, M., et al., Developing a hybrid dictionary-based bio-entity recognition technique, BMC Med Inform Decis Mak. 2015, 15(Suppl 1). S9. (8 Pages).

View, L., et al., Quantitative methods for identifying systematic polysemy classes, 2015. (5 Pages).

Widdows, D., et al., A Graph Model for Unsupervised Lexical Acquisition, pp. 1-7, 2002.

Zaveri, A., et al.. User-driven Quality Evaluation of DBpedia, Proceedings of the 9th International Conference on Semantic Systems, pp. 97-104, Sep. 4-6, 2013.

Zaveri, A., et al.. Quality Assessment for Linked Data: A Survey, Semantic Web 7(1), pp. 63-93, 2016.

Zeng, D., et al.. Distant Supervision for Relation Extraction via Piecewise Convolutional Neural Networks, Proceedings of the 2015

(56) References Cited

OTHER PUBLICATIONS

Conference on Empirical Methods in Natural Language Processing, pp. 1753-1762, Lisbon, Portugal, Sep. 17-21, 2015.
Zhong, Z., et al.. It Makes Sense: A Wide-Coverage Word Sense Disambiguation System for Free Text, Proceedings of the ACL 2010 System Demonstrations, pp. 78-83, Uppsala, Sweden, Jul. 13, 2010.
Zwicklbauer, S., et al., DoSeR—A Knowledge-Base-Agnostic Framework for Entity Disambiguation Using Semantic Embeddings, ESWC 2016, pp. 182-198.

* cited by examiner

IDENTIFYING AMBIGUITY IN SEMANTIC RESOURCES

BACKGROUND

The present embodiments relate to cognitive process and information extraction. More specifically, the embodiments relate to dictionary management directed at identification of problematic terms in a dictionary, the problematic terms being ambiguous or spurious with respect to a given corpus. Management of the dictionary, including selective pruning of identified problematic terms facilitates subsequent application of the dictionary with respect to information extraction and associated tasks.

SUMMARY

The embodiments include a system, computer program product, and method for dictionary membership management directed at identifying ambiguity in semantic resources.

In one aspect, a system is provided with an artificial intelligence (AI) platform and one or more associated tools embedded therein for dictionary membership management directed at identifying ambiguity in semantic resources. A processing unit is operatively coupled to memory and is in communication with the AI platform and the embedded tools, including a dictionary manager, a context manager, and a director. The dictionary manager functions to apply a dictionary of seed terms to a text corpus and identify matching items in the corpus. The context manager characterizes the linguistic properties of each matching item in the corpus and constructs a context pattern from the corpus of each matching item. The director applies each constructed context pattern to the text corpus, and identifies and quantifies the matching content between the dictionary terms and the content extracted with the context pattern from the corpus. The dictionary manager identifies lexicon items from the dictionary that have anomalous behavior reflected in the quantification. In response to one or more seed words being identified as having anomalous behavior, and the dictionary manager selectively removes the identified one or more seed words from the dictionary.

In another aspect, a computer program device is provided for dictionary membership management directed at identifying ambiguity in semantic resources. The program code is executable by a processing unit to apply a dictionary of seed terms to a text corpus and identify one or more matching items in the corpus. The program code characterizes linguistic properties of each matching item in the corpus and constructs a context pattern from the corpus of each matching item. The program code applies each constructed context pattern to the text corpus and identifies and quantifies the matching content between the dictionary terms and the content extracted with the context pattern from the corpus. Lexicon items from the dictionary that have anomalous behavior reflected in the quantification are identified. In response to identification of one or more seed words having anomalous behavior, the identified one or more seed words are selectively removed from the dictionary.

In yet another aspect, a method is provided for dictionary membership management directed at identifying ambiguity in semantic resources. A dictionary of seed terms is applied to a text corpus, and one or more matching items in the corpus are identified. Linguistic properties for each matching item in the corpus are characterized, and a context pattern of each matching item is constructed from the corpus. Each constructed context pattern is applied to the text corpus and matching content between the dictionary terms and the content extracted with the context pattern is identified and quantified. Lexicon items from the dictionary that have anomalous behavior reflected in the quantification are identified. In response to one or more seed words being identified as having anomalous behavior, the one or more identified seed words are selectively removed from the dictionary.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
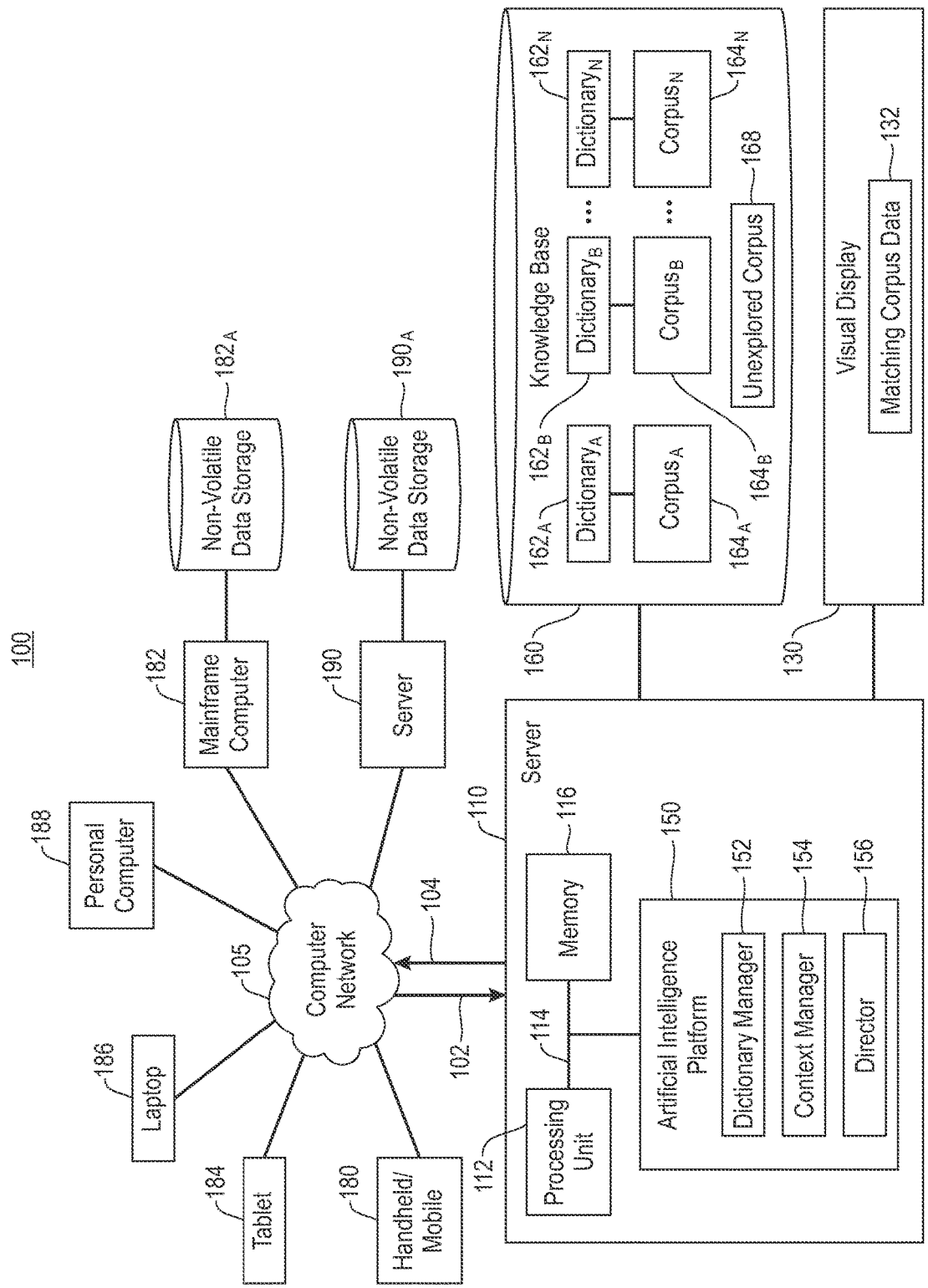
FIG. 1 depicts a system diagram illustrating a system connected in a network environment that supports dictionary membership management.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificial intelligent systems, natural language processing systems (such as the IBM Watson® artificially intelligent computer system and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Dictionaries, ontologies, and linguistic resources, hereinafter collectively referred to as a dictionary, are the backbone of many natural language processing (NLP) and information retrieval systems. Entries in the dictionary are leveraged to identify and extract information, e.g. text, within an unstructured text within a corpus that is linguistically relevant to a corresponding query. However, construction and maintenance of the dictionary is challenging. Introduction of unnecessary errors into the dictionary may limit potential recall of the extraction. At the same time, a dictionary with a static set of terms may not be desirable in that the dictionary does not evolve, and as such, when applied to a text corpus may not properly recall and extract relevant text.

A dictionary is a set of terms that represent items of the same semantic type, i.e. one specific concept, and is commonly used in NLP to detect and extract one or more terms in textual data. It is understood in the art that the dictionary stores a set of values which can be applied to an environment to identify matching terms. The dictionaries may be applied individually or in conjunction with one or more machine learning algorithms. It is understood in the art that a dictionary applied in one domain may not be pertinent or applicable in another domain, and can lead to errors. Examples of such errors include, but are not limited to, spurious terms and ambiguity. In one embodiment, a spurious term is also referred to as noise which commonly results from automatic resource creation. Spurious terms produce isolated patterns that are not shared by other terms in the dictionary. Ambiguity refers to mention of a term in text that has a different meaning from that which is intended by the dictionary.

Like most languages, the English language is ambiguous. The ambiguity can be at the level of individual words, sequence of words, or sentences. A well-known and established hypothesis is that a term's meaning is captured by the distribution of other words around it. When considering specific dictionaries and their application to a specific domain corpus, it is possible, and in one embodiment beneficial, to characterize useful linguistic properties for each item in the dictionary. Accordingly, as shown and described herein and demonstrated in the figures, the degree of ambiguity of each term in a dictionary is characterized with respect to a specific domain corpus.

It is understood in the art that a dictionary may be applied to a textual corpus to identify, and in one embodiment, extract information. Dictionary membership terms are applied to the textual corpus and are used with one or more query protocols to identify relevant information to be extracted. However, appropriate dictionary terms for one textual corpus may not be appropriate or applicable to a different textual corpus, and may result in errors with respect to the extracted information. One source of such errors is ambiguity, where a mention of a term in the text has a different meaning from that which is intended by the particular dictionary. Another source of errors is noise, e.g. spurious terms. Accordingly, by identifying and characterizing ambiguous and spurious terms, and selectively removing the identified terms from the dictionary facilitates subsequent information extraction tasks.

Referring to FIG. 1, a schematic diagram of a computer system (100) to support dictionary membership management is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) with embedded tools to support and enable membership management of the dictionary over the network (105) from one or more of the computing devices (180), (182), (184), (186), (188), and (190). The server (110) is shown herein operatively coupled to a knowledge base (160). Each of the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In addition, each of the computing devices (180)-(190) is operatively coupled to the knowledge base (160) across the network (105). Other embodiments of the server (110) may be used with components, systems, sub-systems, and/or devices other than those that are depicted herein.

The AI platform (150) is shown herein configured with tools to manage and facilitate application of cognitive computing to dictionary membership, and more specifically to support membership and membership management of the dictionary. As shown, the knowledge base (160) is operatively coupled to the AI platform (150) and is configured with a plurality of dictionaries, shown herein as dictionary$_A$ (162$_A$), dictionary$_B$ (162$_B$), and dictionary$_N$ (162$_N$). Each of the dictionaries is shown operatively coupled to a corresponding textual corpus, including corpus$_A$ (164$_A$) operatively coupled to dictionary$_A$ (162$_A$), corpus$_B$ (164$_B$) operatively coupled to dictionary$_B$ (162$_B$), and corpus$_N$ (164$_N$)

operatively coupled to dictionary$_N$ (162$_N$). Although only three corpus and corresponding dictionaries are shown, the quantity should not be considered limiting. In one embodiment, the dictionaries (162$_A$), (162$_B$), and (162$_N$) are referred to as domain specific dictionaries, with each dictionary subject to membership management with respect to a specific or assigned text corpus.

Each text corpus is shown with an operatively coupled dictionary. Each dictionary includes one or more text based terms, referred to herein as dictionary instances or seed terms or seed words. As the dictionary is applied to a designated or assigned corpus by the tools of the AI platform (150), the dictionary instances are utilized to identify text within the corpus that is relevant, or in one embodiment relevant or related to the seed terms of the corresponding dictionary. In one embodiment, the dictionary may be applied to more than one corpus, such as application of dictionary$_A$ (162$_A$) to corpus$_B$ (164$_B$). Seeds terms in the dictionary that may have been appropriate or relevant to corpus$_A$ (164$_A$) may be ambiguous or inappropriate for application to corpus$_B$ (164$_B$). Accordingly, the AI platform (150), and more specifically the tools that comprise the AI platform (150), functions to manage dictionary membership with respect to the textual corpus to which the dictionary is subject to application.

The tools that comprise the AI platform (150) include a dictionary manager (152), a context manager (154), and a director (156) to manage dictionary membership. The dictionary manager (152) functions to apply natural language processing (NLP) to a textual corpus. For example, as shown herein, the knowledge base (160) is populated with a plurality of textual corpus and associated dictionaries. The dictionary manager (152) selects a dictionary and identifies the corresponding corpus, or in one embodiment a non-corresponding corpus. Each dictionary is populated with entries, referred to herein as dictionary instances or seed terms. The NLP application includes the dictionary manager (152) to apply the seed terms that are populated in the dictionary to the designated corpus. The dictionary manager (152) applies one or more of the dictionary instances against the selected or identified text corpus. Accordingly, the dictionary and corresponding dictionary instances are identified for application to the text corpus.

The dictionary manager (152) uses the seed words (or seed terms) that currently populate the dictionary to identify similar terms in the corpus. In one embodiment, the dictionary manager (152) uses a neural language model to identify the similar terms. Similarly, in one embodiment, the dictionary manager (152) utilizes an algorithm for the identification, with the algorithm directed at identification of semantically similar words in the text corpus to the instances that have already been populated into the dictionary. It is understood in the art that semantically similar words are words that have semantic similarity, but are not related. In one embodiment, each seed word of the dictionary is represented as a vector, and the dictionary manager (152) calculates similarity between the dictionary instances in vector form to the instances in the corpus that are represented as a neural language model. In one embodiment, the similarity calculation includes the dictionary manager (152) using a cosine similarity measure for the assessment between the dictionary seed words and the corpus instances. Accordingly, the dictionary manager (152) uses the calculation, and in one embodiment, the similarity measurement, as a basis for identification of matching items in the corpus.

As shown, the context manager (154) is operatively coupled to the dictionary manager (152), and functions to evaluate the selected or identified text corpus as related to the dictionary. The identified text may be syntactically related to the seed terms of the dictionary, but in reality may not be linguistically related to the seed terms. The context manager (154) functions to characterize the linguistic properties of the matching items identified in the text corpus, which in one embodiment are referred to as preliminarily matching items. The characterization conducted includes the context manager (154) to construct a context pattern of each identified matching items, with the context pattern emanating from the text corpus. In one embodiment, the context pattern identifies the matching item(s) together with the context of the set of words in the text corpus surrounding the occurrence of the matching item. In one embodiment, the seed word(s) may have multiple appearances in the text corpus, with different appearances having a different selection or arrangement of sets of words in the text corpus surround the occurrence. The constructed context pattern provides data directed at the setting of the word(s) in the text corpus. It is understood that the context of multiple occurrences in the same text corpus may yield the same or different context patterns. Accordingly, the context manager (154) constructs a context pattern for each occurrence of each matching dictionary seed word in the text corpus.

The context pattern is constructed by the context manager (154) and emanates from the textual corpus to identify one or more extension instances associated with the text corpus that are proximally positioned to the matching items identified by the dictionary manager (152). The extension instances may not appear as matching items with respect to the seed words. Rather, the extension instances are a set or defined quantity of words present in the text corpus that are positioned both before and after each matching item. In one embodiment, the context manager (154) identifies contextually related extension instances. Contextually related words are words that appear in the same context, e.g. "stomach" and "ache", but they are not semantically similar. In one embodiment, the context manager (154) generates the context pattern as a new multi-token instance. The token is a term in the instance. For example, a compound instance may be comprised of two or more terms, each term referred to herein as a token. The context manager (154) effectively creates patterns of terms from the text corpus to provide terminology to the usage of the seed term in the text corpus. Accordingly, the context manager (154) creates patterns comprised of multiple tokens to demonstrate usage of the matching items, with the tokens providing characteristics data of how the matching items are used in the corresponding text.

It is understood that different text corpus include different content, and may vary in size. For example, in one embodiment, the text corpus may be relatively small, or in another embodiment, the text corpus may be relatively large. Processing a dictionary and dictionary seed terms may be inefficient with respect to a relatively large corpus, and may utilize an abundant quantity of computing resources. Prior to processing the dictionary against the text corpus, the dictionary manager (152) evaluates the size or relative size of the text corpus, and in the event the text corpus is identified as large or relatively large, the dictionary manager (152) may identify one or more select portions of the corpus to be subject to application for matching items. In one embodiment, whether the text corpus is deemed relatively large or not relatively large, the dictionary manager (152) may randomly select one or more portions of the text for application of the dictionary to identify matching items. Accordingly, application of the dictionary to the text corpus may identify one or more select portions of the text corpus, or the text corpus in its entirety.

The constructed context pattern(s) functions as a platform and representation of semantically cohesive terms to exploit the context in which the seeds occur in the text corpus. The director (156), which is shown herein operatively coupled to the context manager (154), functions to examine the constructed context pattern(s). More specifically, the director (156) functions to quantify the information content behind an extracted pattern by applying each constructed context pattern(s) to the associated dictionary, and identifying matching content between the seed terms and the content of the constructed context pattern(s). The quantification of the context pattern(s) enables the director (156) to classify the constructed context pattern(s) as unaligned patterns or aligned patterns. An unaligned pattern is defined as a context pattern wherein a minimal quantity of components of the pattern(s) is contained in the dictionary, e.g. dissimilar, and an aligned pattern is defined as a context pattern where a select quantity of components of the pattern(s) is contained in the dictionary.

The examination conducted by the director (156) includes calculation of a score corresponding to the identified matching content. In conducting the calculation, the director (156) reviews a set of terms produced in the constructed pattern(s) subject to review, and assesses the term and seed word matching. The director (156) utilizes a score function to quantify or otherwise characterizes the assessment. In one embodiment, the score function finds patterns which match only a single term from the dictionary, but also match at least one other term not in the dictionary, which do not match too many terms. This function eliminates patterns such as "and *" that match too many contexts to be useful. Each dictionary term(s) that occurs in such a pattern receives a point, with the point functioning as an indicator that in the given corpus a single, possibly ambiguous context in which a term was used is spotted. In one embodiment, any term that occurs at all in the corpus will generate a few points. It is the term that generates many more points relative to other terms in the lexicon that is more likely being used on other senses and scenarios than desired. Accordingly, the score characterizes matching items between the context pattern and the dictionary seed terms.

The director (156) attaches the assessed score to the corresponding seed word in the dictionary. The assessed score functions as metadata to the seed word. The metadata represents a degree of ambiguity of the seed word with respect to the corresponding corpus. The goal of the tools (152)-(156) is to manage membership of seed words in the dictionary as applied to a text corpus. It is understood that seed words with a score that is high in relation to other seed words in the dictionary may be considered ambiguous or spurious with respect to the corpus. In one embodiment, the points serve as a probability value, with a higher score value identifying a sufficiently high probability of the ambiguity of the seed word(s). The dictionary manager (152) identifies seed word(s) in the dictionary that are considered or determined to have anomalous behavior, as reflected in the score, e.g. seed word metadata. In one embodiment, the seed words in the dictionary are sorted, and in one embodiment ranked, based on the seed word metadata. A decision with respect to dictionary membership may entail pruning the dictionary membership to mitigate identification of anomalous or spurious content. The dictionary manager (152) is responsible for dictionary membership, and in one embodiment selectively removes one or more of the seed words from the dictionary. Accordingly, the dictionary membership supports selective removal of seed terms to mitigate, if not eliminate, the presence of distracting items from the dictionary.

As shown, the dictionary manager (152) controls dictionary membership in the form of selectively removing seed terms from the dictionary. The iterative contraction of the dictionary includes two aspects, including a first aspect to construct content patterns corresponding to discovered instances of the seed word from the text corpus and a second aspect to characterize and quantify matching content from the constructed content patterns. In one embodiment, a subject matter expert (SME) performs an adjudication of proposed candidate dictionary instances for selective removal from the dictionary. Accordingly, the director (154) manages dictionary membership with respect to the contextual evaluation of the identified instances.

The various computing devices (180), (182), (184), (186), (188), and (190) in communication with the network (105) may include access points for the text corpus, shown herein as corpus$_A$ (164$_A$), corpus (164$_B$), and corpus$_N$ (164$_N$) of the knowledge base (160) and the corresponding domain-specific dictionaries, shown herein as dictionaries (162$_A$), (162$_B$), and (162$_N$). The AI platform (150) functions to manage dictionary membership of the domain-specific dictionaries, and applications of the managed dictionaries to an unexplored or selected corpus. It is understood that the domain specific dictionary may be subject to pruning to remove seed words that are ambiguous or spurious, so that application of the dictionary may return applicable and appropriate data. Application of the pruned domain-specific dictionary is managed by the dictionary manager (152) to identify matching and aligning corpus data (132), also referred to herein as output data. In one embodiment, the AI platform (150) communicates the matching and aligning corpus data (132) to a visual display (130), shown herein operatively coupled to the server (110) or one or more of the computing devices (180)-(190) across network connection (104).

The network (105) may include local network connections and remote connections in various embodiments, such that the AI platform (150) may operate in environments of any size, including local and global, e.g. the Internet. The AI platform (150) serves as a front-end system that can make available a variety of knowledge extracted from or represented in documents, network accessible sources and/or structured data sources. In this manner, some processes populate the AI platform (150), with the AI platform (150) also including input interfaces to receive requests and respond accordingly.

As shown, one or more of the corpus, e.g. corpus$_A$ (164$_A$), corpus (164$_B$), and corpus$_N$ (164$_N$) of the knowledge base (160), may be in the form of one or more logically grouped documents or files. The knowledge base (160) may include structured and unstructured documents, including but not limited to any file, text, article, or source of data (e.g. scholarly articles, dictionary, definitions, encyclopedia references, and the like) for use by the AI platform (150). Content users may access the AI platform (150) via a network connection or an internet connection to the network (105). The dictionary manager (152) submits or manages application of a domain-specific dictionary to an appropriately classified corpus for dictionary membership management, e.g. pruning, and the context manager (154) manages identification of context patterns in the corresponding or identified corpus, or in one embodiment, a different corpus than that employed for the dictionary membership management. The director (156) effectively assesses the context patterns, and uses a corresponding assessment value to identify aligned, and in one embodiment unaligned, context patterns. The dictionary manager (152) prunes or otherwise identifies unaligned seed words of the corresponding dictionary. The pruned dictionary may then be utilized in a corresponding query and query output to selectively remove query results that correspond to the unaligned seed words. The query output may be identified and presented as output response (132) by searching content in the corpus operatively coupled to the knowledge base (160) or any electronic data source operatively coupled to the server (110) across the network (105).

The AI platform (150) is shown herein with several tools to support dictionary membership and application. The tools, including the dictionary manager (152), the context manager (154), and the director (156), either individually or collectively function as either a software tool or a hardware tool.

In some illustrative embodiments, server (110) may be the IBM Watson® system available from International Business Machines Corporation of Armonk, N.Y., which is augmented with the mechanisms of the illustrative embodiments described hereafter. The IBM Watson® system may support the tools (152)-(156) to support the iterative membership management of one or more domain-specific dictionaries, and application of the managed dictionaries. Matching corpus or output response data (132) is identified by applying the managed dictionary to a select corpus, such as an unexplored corpus (168), and looking for portions of the unexplored corpus (168) that have some potential for containing a response matching content characteristic(s) of the seed words that populate the applied dictionary. In one embodiment, the dictionary manager (152) may segment the identified unaligned seed words and apply the segmented seed words to query response data, identify a set of unaligned query response data and a set of aligned query response data, and present the set of aligned query response data as output (132) directed at specific content. In one embodiment, the response output (132) may be in the form of a link to a source for the response content. Similarly, in one embodiment, the response output (132) may include both content and the source link. Accordingly, the content of the response may come in different forms, or a combination of forms.

The dictionary manager (152), context manager (154), and director (156), collectively referred to as AI tools, are shown as being embodied in or integrated within the AI platform (150) of the server (110). The AI tools may be implemented in a separate computing system (e.g., 190) that is connected across network (105) to the server (110). Wherever embodied, the AI tools function to evaluate and iteratively manage the seed words that populate one or more domain-specific dictionaries, apply the managed dictionary to an unexplored corpus (168), or in one embodiment apply the dictionary to an explored corpus, and identify and communicate response content (132).

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

The information handling system employed to support the AI platform (150) may take many forms, some of which are shown in FIG. 1. For example, AI platform may take the form of a desktop, server, portable, laptop, notebook, or other form factor computer or data processing system. In addition, the information handling system to support the AI platform (150) may take other form factors such as a personal digital assistant (PDA), a gaming device, ATM machine, a portable telephone device, a communication device or other devices that include a processor and memory. In addition, the information handling system need not necessarily embody the north bridge/south bridge controller architecture, as it will be appreciated that other architectures may also be employed.

Figure 2:
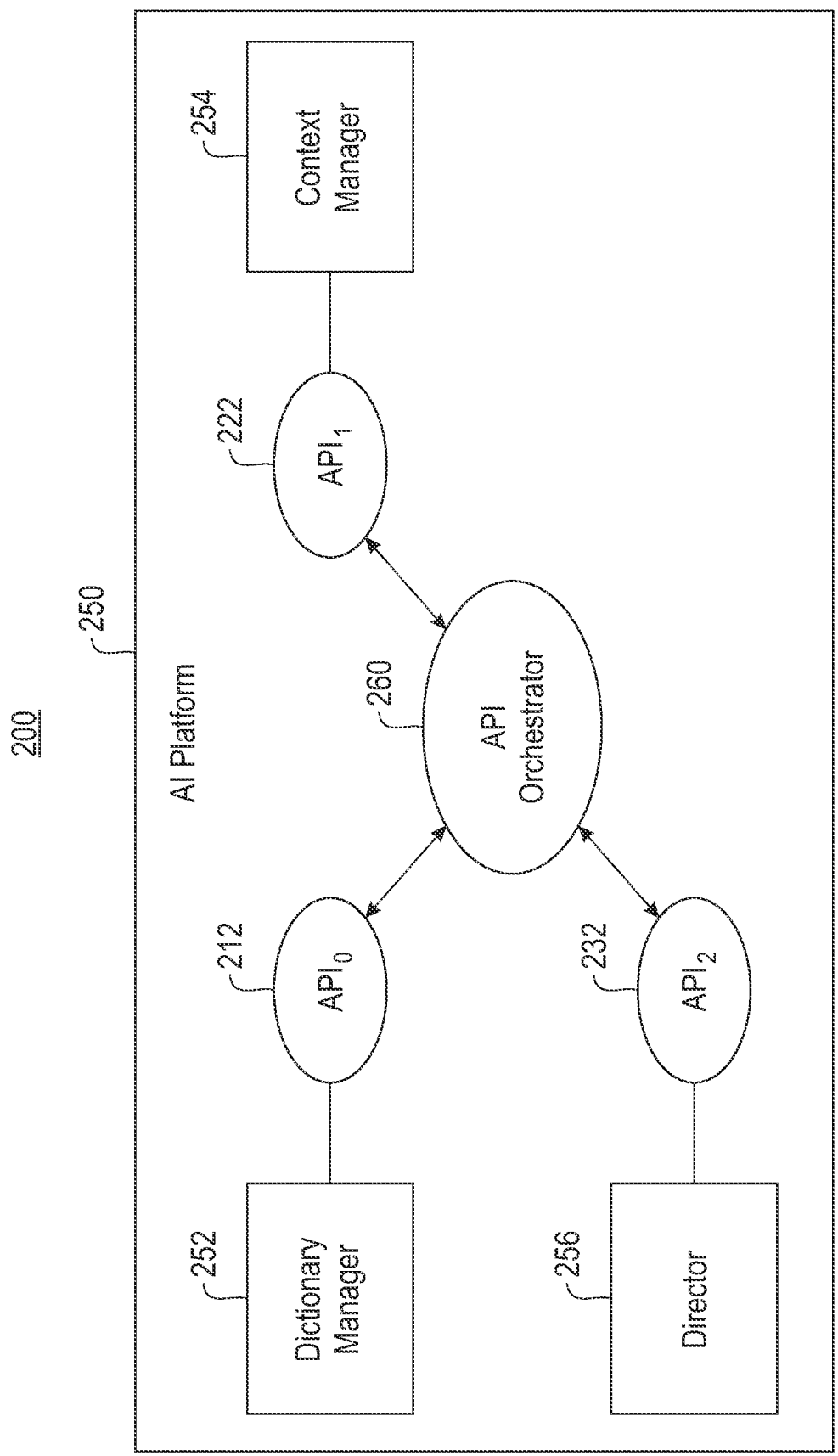
FIG. 2 depicts a block diagram illustrating the AI platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(156) and their associated functionality. Referring to FIG. 2, a block diagram (200) is provided illustrating the tools (152)-(156) and their associated APIs. As shown, a plurality of tools are embedded within the AI platform (250), with the tools including the dictionary manager (252) associated with $API_0$ (212), the context manager (254) associated with $API_1$ (222), and the director (256) associated with $API_2$ (232). Each of the APIs may be implemented in one or more languages and interface specifications. $API_0$ (212) provides functional support to apply dictionary seed terms to a corpus, identify matching corpus items, evaluate corresponding context patterns, and segment or prune dictionary membership responsive to the evaluation; $API_1$ (222) provides functional support to characterize linguistic properties of matching corpus items, and more specifically to construct corresponding context patterns; and $API_2$ (232) provides functional support to evaluate and quantify the context patterns. As shown, each of the APIs (212), (222), and (232) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
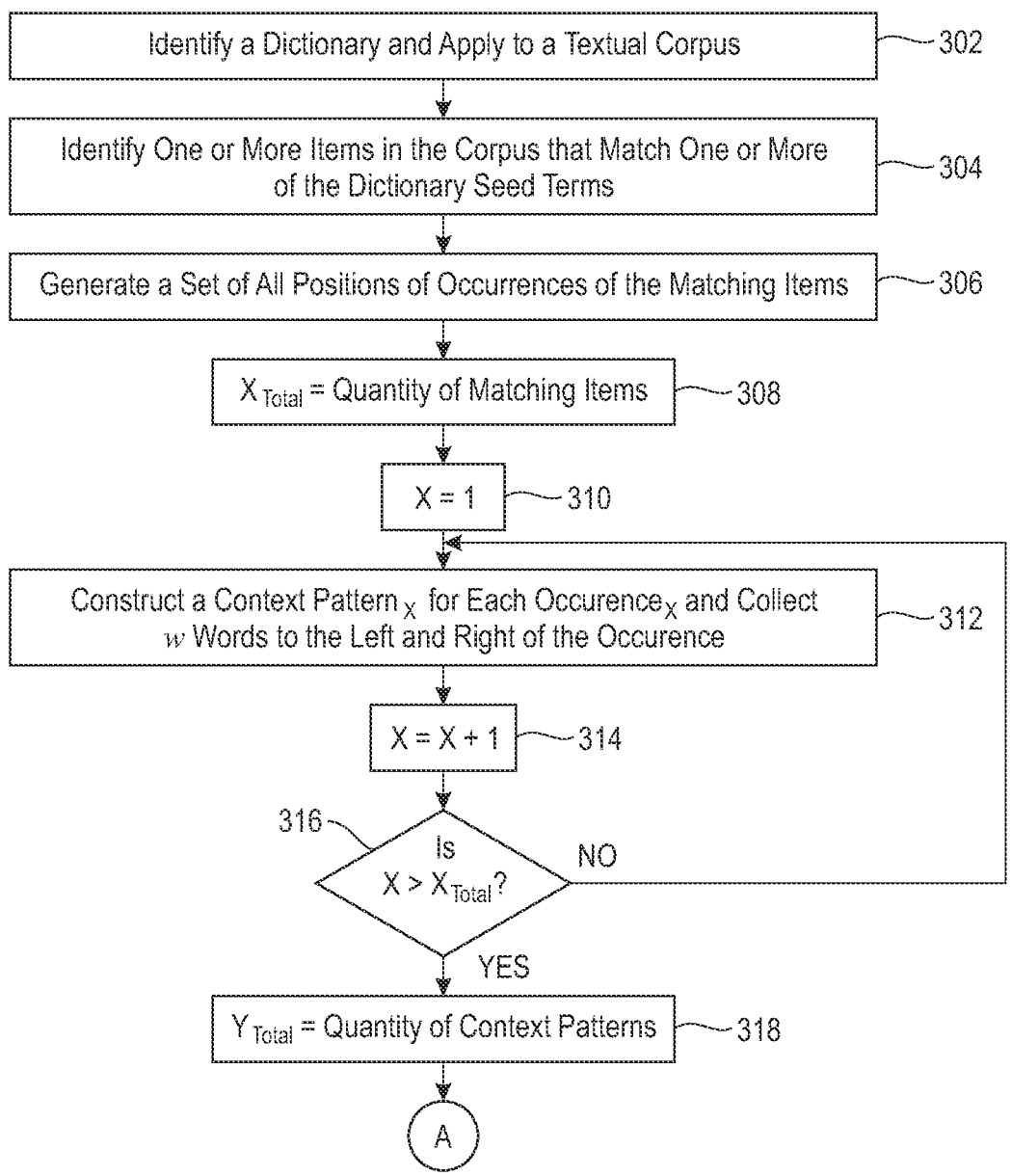
FIG. 3 depicts a flow chart illustrating dictionary membership management directed at identifying ambiguity in semantic resources.
Figure 3:
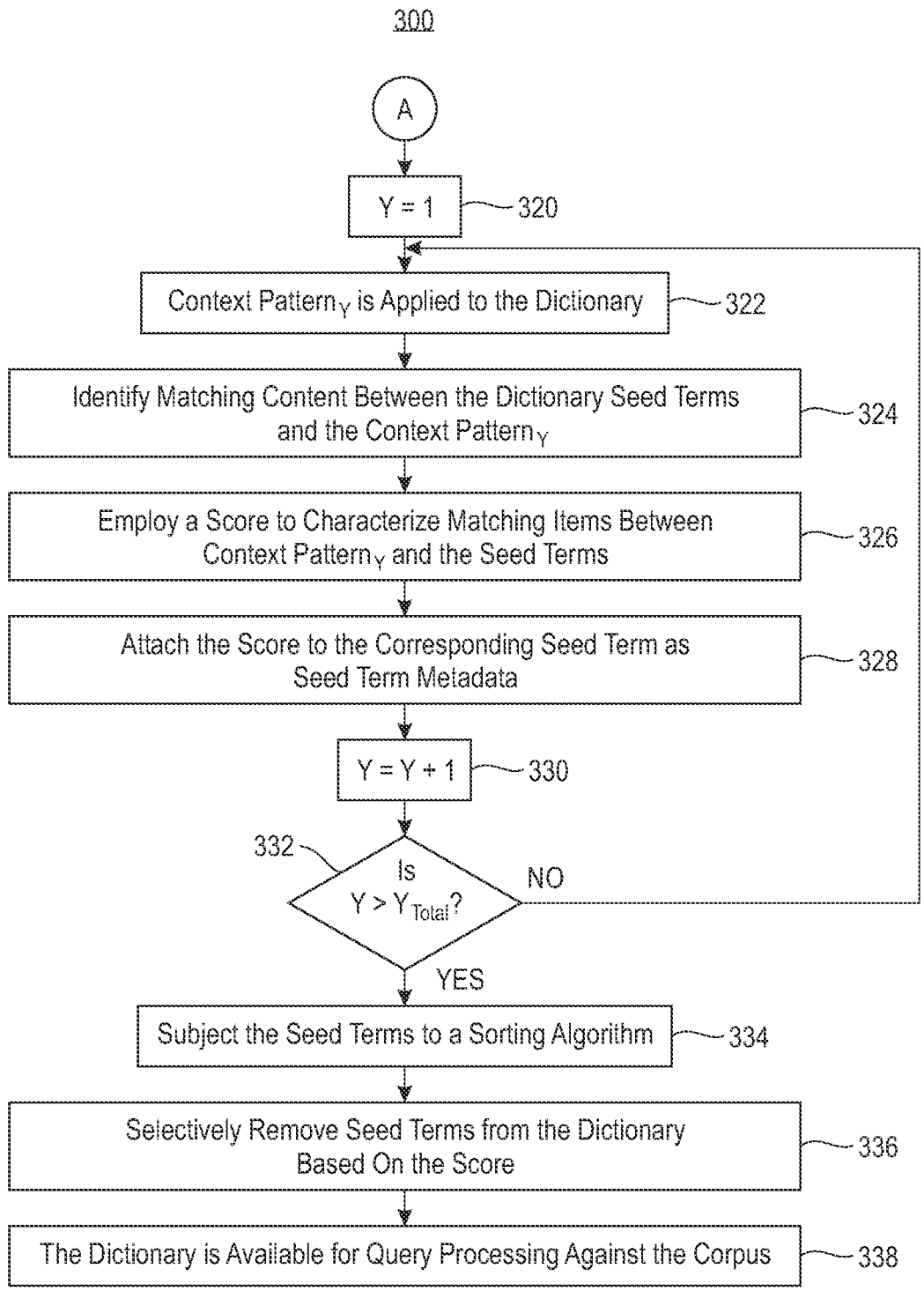

Referring to FIG. 3, a flow chart (300) is provided to illustrate dictionary membership management directed at identifying ambiguity in semantic resources. As shown, a dictionary is identified and a textual corpus is identified, and the dictionary is applied to the textual corpus (302). In one embodiment, the identified dictionary may exist in some form and previously be subjected or applied to a different textual corpus. The identified dictionary is populated with seed words, and through application to the textual corpus, one or more items in the textual corpus that match one or more of the dictionary seed words are identified (304). In one embodiment, the matching items may be present in different locations in the corpus. To address the location(s), a set of all positions of occurrences of the matching items is generated (306). Each of the matching items is then subject to a contextual analysis to quantify a relationship of the matching item to the dictionary. In one embodiment, the dictionary may have previously been applied to a different corpus, and as such, one or more of the seed words in the dictionary may be irrelevant to the corpus. Accordingly, the initial aspect of dictionary membership management is directed at identifying matching items in the corpus to the seed words in the dictionary.

Following step (306), the variable $X_{Total}$ is assigned to represent the quantity of matching items (308), as identified at step (304). A corresponding matching item counting variable is initialized (310), so that the content of the occurrence of each matching item can be examined. As shown, a context pattern$_X$ is constructed for each occurrence$_X$ (312). The construction at step (312) includes identifying a context window, w, and collecting tokens, e.g. words, to the left and right of the occurrence. In one embodiment, the context window is a configurable value. For example, if the context window, w, is set to 3, then the context pattern would include the three words prior to the occurrence, the occurrence, and three words after the occurrence. The context pattern is constructed for each occurrence. In one embodiment, the dictionary is applied to a subset of the corpus, e.g. a select section of the corpus, and the context patterns is only constructed to matching occurrences in the subset. Following step (312), the matching item counting variable, X, is incremented (314). It is then determined if a context pattern has been constructed or otherwise created for each identified matching item (316). A negative response to the determination at step (314) is followed by a return to step (312), and a positive response concludes the context pattern construction. Accordingly, for each part of the corpus subject to review and processing, matching occurrences to the dictionary seed words are identified, and corresponding context patterns are constructed.

Following step (316), the constructed context patterns are subject to processing. As shown, the variable $Y_{Total}$ is assigned to represent the quantity of constructed context patterns (318). In one embodiment, the variable $Y_{Total}$ is the same value as the variable $X_{Total}$. A corresponding context pattern counting variable, Y, is initialized (320). The context pattern$_Y$ is applied to the dictionary (322), and matching content between the dictionary seed terms, also referred to here as dictionary terms or dictionary words, and the content extracted with context pattern$_Y$ are identified (324). The matching content is then subject to further processing. More specifically, a score is employed to characterize matching items between context pattern$_Y$ and the seed terms (326). An example of the score and corresponding assessment is shown in the pseudo code described below. The score identified at step (326) is attached to the corresponding seed word as seed word metadata (328). Following step (328), the context pattern counting variable is incremented (330), and it is then determined if each of the context patterns has been assessed (332). A negative response to the determination at step (332) is followed by a return to step (322), and a positive response concludes the score assessment and attachment. Accordingly, each context pattern is subject to an assessment, and a score returned from the assessment is attached to the corresponding seed word as metadata.

As shown and described in FIG. 1, dictionary membership, and more specifically, membership of seed words in the dictionary, is subject to pruning or modification to remove or designate a set of seed words in the dictionary. The set of designated seed words are identified as problematic terms in the dictionary with respect to a given corpus. In one embodiment, the set of designated seed words are ambiguous or spurious. Following step (332), the seed words of the dictionary are subject to a sort or sorting algorithm (334). In one embodiment, the seed words are placed in an order based on the attached metadata. A set of the sorted seed words are either removed from the dictionary, or in one embodiment are placed in a designated subset of seed words in the dictionary (336). In one embodiment, a high value of the metadata reflects anomalous behavior. Following step (336), the dictionary with the processed seed words is available for query processing against the designated corpus (338). Accordingly, membership of seed words in the dictionary is managed to remove problematic terms, which may yield problematic query result data.

The following is pseudo code that may be utilized to find ambiguous and spurious items:

```
1.   Let the dictionary of terms (or words) be L
2.   Let the corpus examined be C
3.   Let the context window size be w
4.   Let O be the positions of all occurrences of L in C
5.   Randomize the order of O and select the first n positions as O⁰
6.   Let P be the set of generated patterns (initially ∅)
7.   for all O⁰ as o do
8.       for all l ∈ {0 . . . w} do
9.           for all r ∈ {0 . . . w} do
10.              p ← (l tokens to the left of O_begin)
                     (1-w tokens) "center match"
                     (r tokens to the right of O_end)
11.          P ← P ∪ p
12.  Let C be a random selection of chunks of C
13.  for all P as R do
14.      M ← the center matches from applying R to C
15.      if |M| > 1 ∧ |M ∩ L| = 1 ∧ |M| < M_max
             then Score (M ∩ L) = Score (M ∩ L) + 1
16.  S = topN(sort(Score))
```

As shown, input is a dictionary of terms L and a target corpus C in which new terms can be selectively added or removed from the dictionary of terms L. The algorithm initially generates the set of O of all positions of occurrences of all l∈L in the corpus C. These occurrences are reviewed to examine the context in which they occur. Starting from O, the set of term occurrences at step 7, patterns around o∈O are generated, with a context window of up to w tokens to the left and right. All the patterns are collected into set P. The scoring function is shown at line 15 which finds patterns which match only a single term from the given dictionary L, but also match at least one other term not in L, and which do not match too many terms. This eliminates patterns, such as "and *", that match too many contexts to be useful. Each dictionary term that occurs in such a pattern receives a point. Each point indicates that in a given corpus a single, and possibly ambiguous context, in which the term was used has been identified. In one embodiment, it is understood that any term that occurs in the corpus will generate a few points. It is the term that generates more points than other terms in the lexicon is more likely being used in other non-relevant scenarios. Accordingly, the quantity of points accumulated for a term is evaluated with respect to other identified terms and their accumulated points.

As further shown in the pseudo code, concept terms are sorted by their score, and the top N terms are selected. These are the terms in the dictionary, e.g. seed words that may be ambiguous or spurious with respect to the corpus. In one embodiment, a human-in-the-loop, e.g. subject matter expert (SME), is employed to adjudicate the identified terms. Points are not unequivocal proof of ambiguity. However, a term with many points has a sufficiently high probability to justify scrutinizing. Information about ambiguity can be exploited in different ways, depending on the subsequent task. If a dictionary is being created, ambiguous terms may not be removed, although spurious terms should be removed. However, ambiguous terms should not be used in the expansion phase of the dictionary due to associated noise they create. Accordingly, the decision to remove or handle ambiguous terms for dictionary membership may evolve based on a corresponding scenario and intended application of the dictionary.

The following use case is an example of dictionary seed term membership management. Most prescription medication names are unique, but the trademark assigned to the medication may not be unique when applied in a different environment. For example, a trademark TODAY is for a medication. Most exact word searches for the term TODAY, even in medical literature, will likely not refer to this product. Knowing whether a dictionary contains ambiguous words with respect to a corpus can facilitate or even eliminate a word sense disambiguation task. The seed words in a dictionary may be sorted by corpus ambiguity into three categories, with a first category including seed words which are unique and unambiguous, a second category including seed words which are common in another scenario, and a third category including seed words which may or may not be accurate. Seeds word in the first category can be used for entity spotting without further processing, and seed words in the second category and the third category would be subject to selective processing, with the third category requiring more complex processing than the second category.

The following use case is directed at electronic search advertisement offered by search engines. Customers who want to advertise their products or services need to provide a list of keywords or entities, which are used by the search engine providers to perform keyword-based advertisement retrieval. Often the keywords in the provided list of keywords may be ambiguous. The system and process shown in FIGS. 1-3 circumvent the ambiguity by ignoring keyword matches that occur within unaligned patterns.

Another use case is directed at prior art patent searching. Automated patent search for prior art of an invention disclosure may involve keyword searches of patents and patent publications databases. These keywords can be ambiguous, thereby resulting in identification of unrelated prior art. Using the system and process shown in FIGS. 1-3, prior art that contains the core keywords of the subject disclosure can be excluded when that prior art uses keywords in a manner that does not align with the pattern of usage from the disclosure. Accordingly, using the system and process shown in FIGS. 1-3, the search results will produce prior art that is directed to and appropriate for the disclosure.

It is understood in the art that dictionary membership management may have some objective characteristics, and also some subjective characteristics. For example, in one embodiment, the method and system supports interaction of a human-in-the loop (HumL) to control direction of the dictionary membership, such as accepting or rejecting candidate seed words. In one embodiment, the HumL controls semantic drift of the dictionary membership.

In a technical scenario, the dictionary that has been subject to seed word membership management may be applied against an unexplored corpus to identify contextually related data. Aspects of the dictionary expansion and application as shown in FIG. 1-3, employs one or more functional tools, as shown and described in FIG. 1. Aspects of the functional tools (152)-(156) and their associated functionality may be embodied in a computer system/server in a single location, or in one embodiment, may be configured in a cloud based system sharing computing resources. With references to FIG. 4, a block diagram (400) is provided illustrating an example of a computer system/server (402), hereinafter referred to as a host (402) in communication with a cloud based support system, to implement the processes described above with respect to FIGS. 1-3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
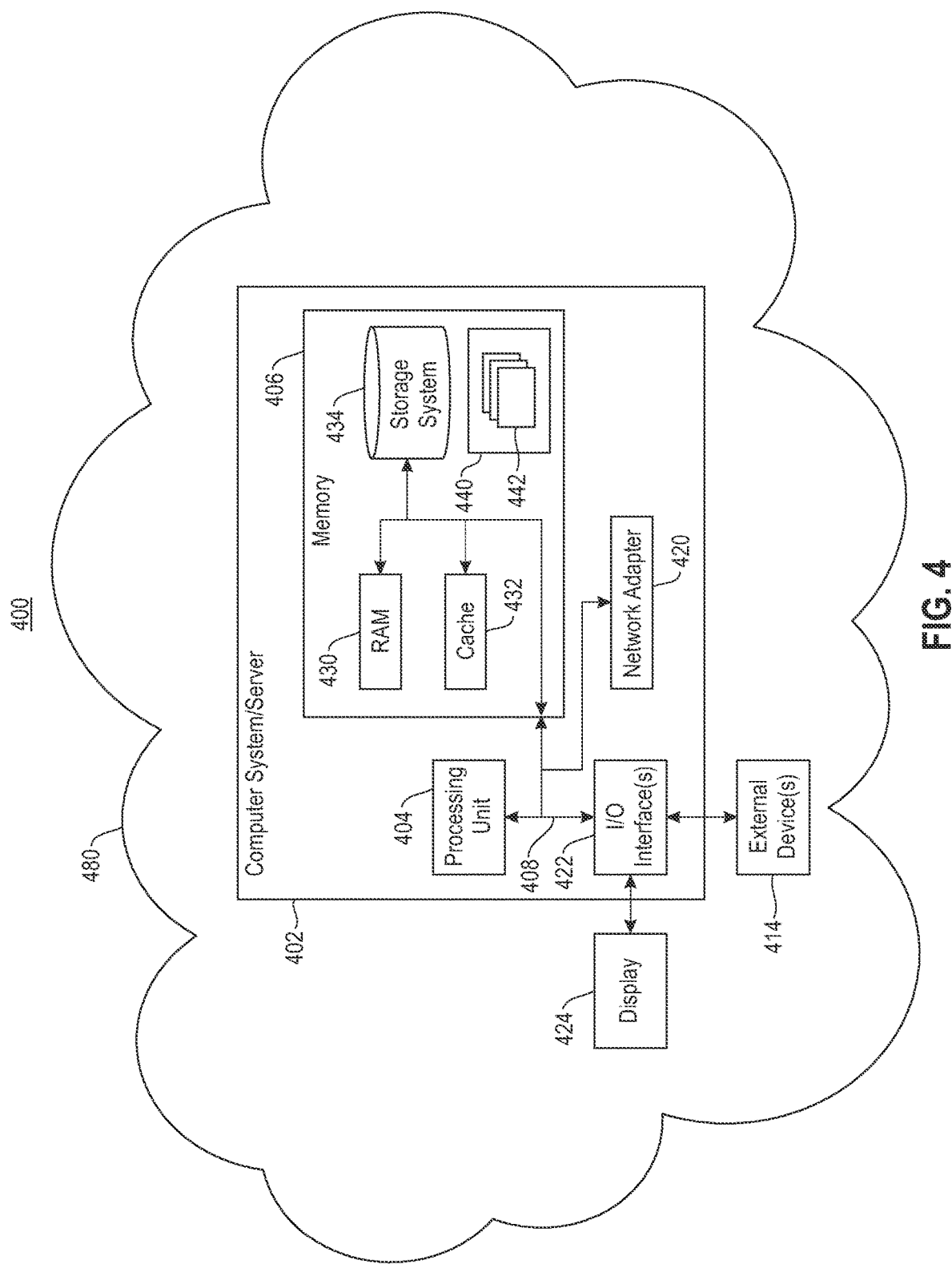
FIG. 4 depicts a block diagram illustrating an example of a computer system/server of a cloud based support system, to implement the system and processes described above with respect to FIGS. 1-3.

As shown in FIG. 4, host (402) is shown in the form of a general-purpose computing device. The components of host (402) may include, but are not limited to, one or more processors or processing units (404), e.g. hardware processors, a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to iteratively manager manage seed word membership of one or more domain-specific dictionaries, and apply the managed dictionary to an unexplored corpus to identify matching data within the corpus to the seed word instances of the dictionary. For example, the set of program modules (442) may include the tools (152) (156) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In one embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
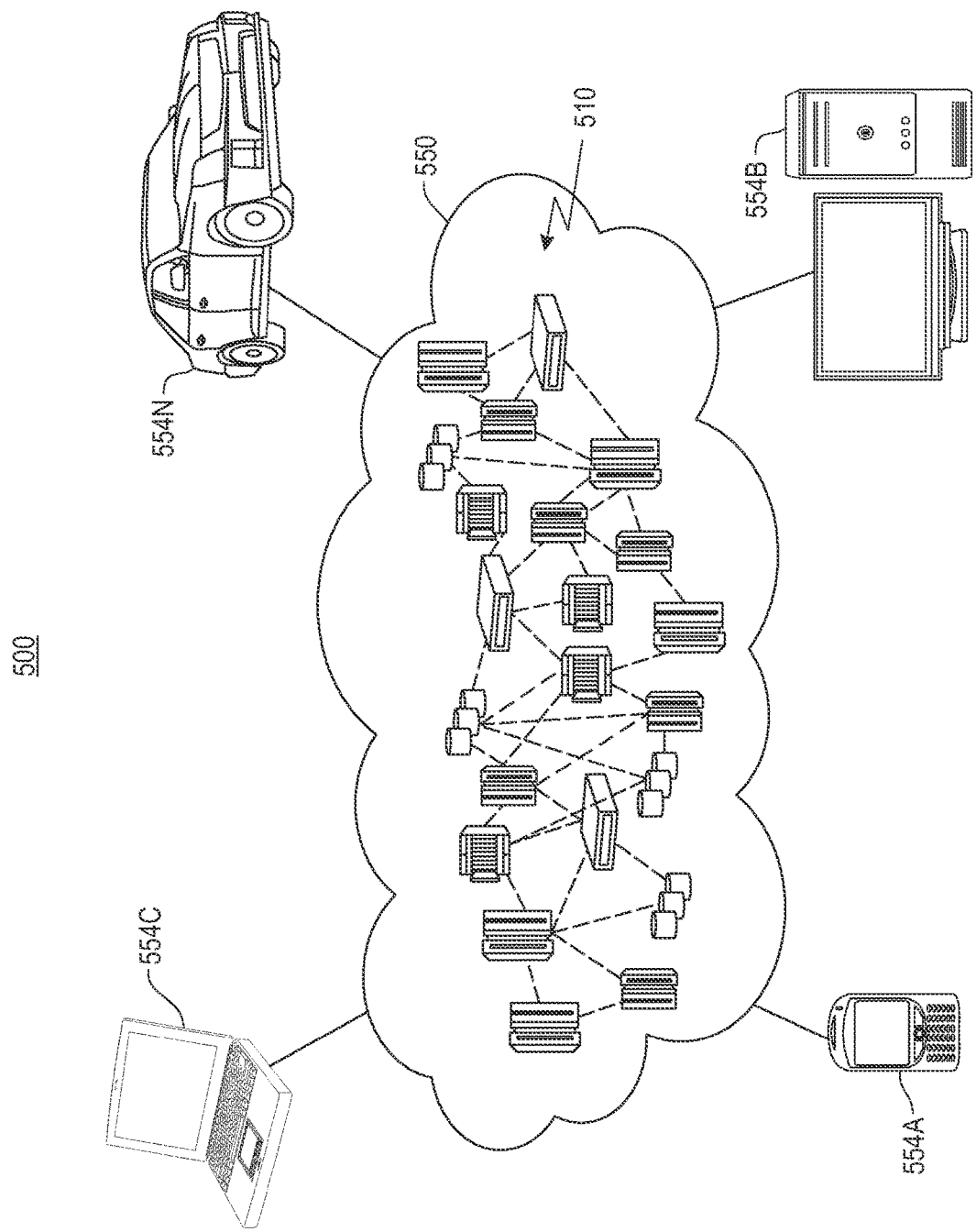
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
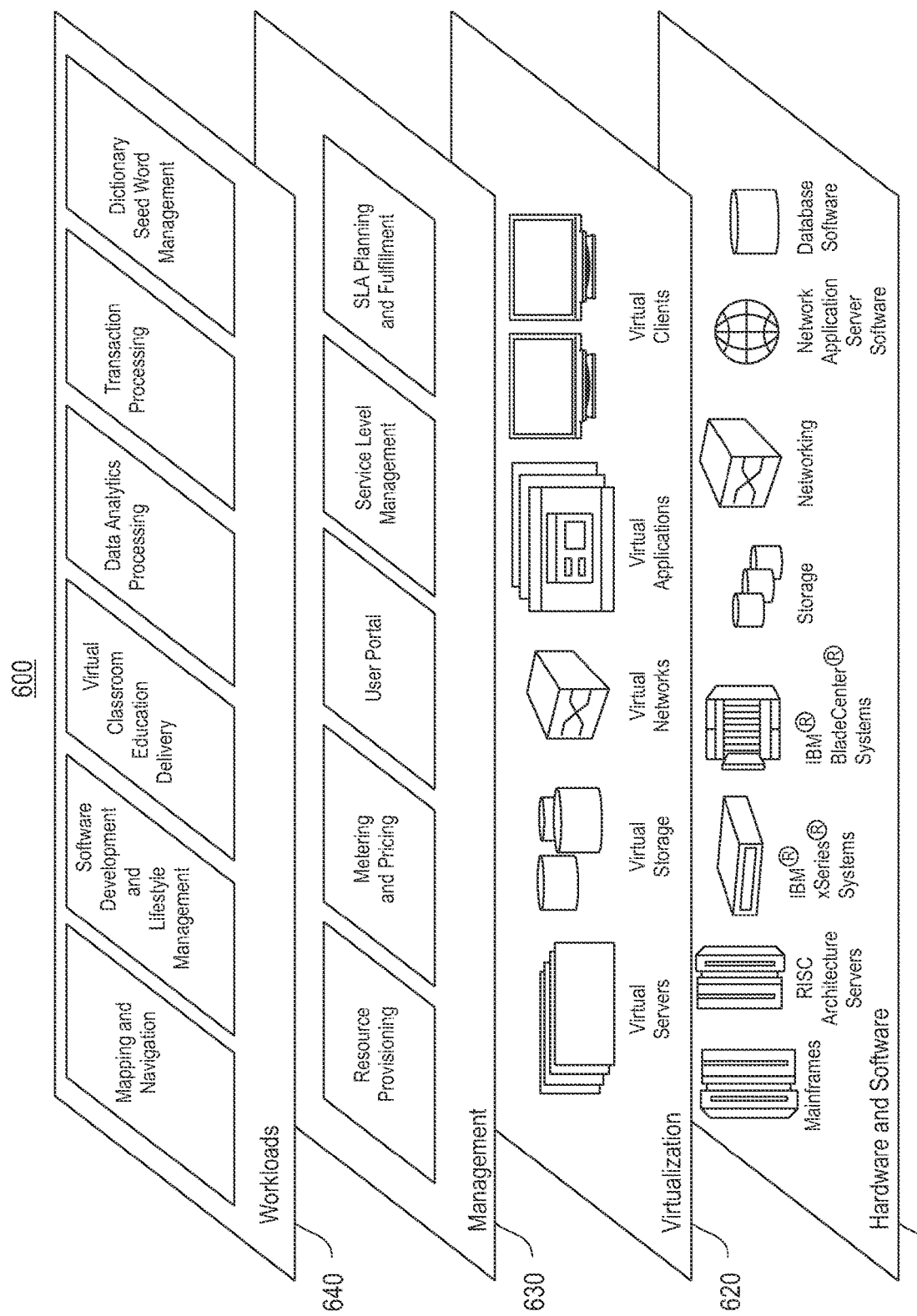
FIG. 6 depicts a block diagram illustrating a set of functional abstraction model layers provided by the cloud computing environment.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dictionary seed word management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to expand the dictionary and apply the expanded dictionary and dictionary instances to identify matching corpus data.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
 a processing unit operatively coupled to memory; and
 an artificial intelligence (AI) platform in communication with the processing unit, the AI platform configured to manage dictionary membership, including:
  a dictionary manager configured to apply natural language processing (NLP) to a textual corpus, including configured to apply seed terms of a dictionary to the textual corpus and identify one or more matching items in the textual corpus;
  a context manager configured to characterize linguistic properties of each matching item in the textual corpus, including the context manager configured to construct a context pattern from the textual corpus for each of the identified one or more matching items;
  a director operatively coupled to the context manager and the dictionary manager and configured to:
   apply each constructed context pattern to the dictionary;
   identify matching content between the seed terms of the dictionary and content of the context pattern; and
   quantify the identified matching content, including to assess scores for the seed terms, the score for the seed term representative of a quantity of the context patterns matching the seed term; and
  the dictionary manager further configured to:
   identify one or more anomalous seed terms from the seed terms of the dictionary, the one or more anomalous seed terms having ambiguous behavior as reflected by the quantification; and
   selectively remove the identified one or more anomalous seed terms from the dictionary, including to selectively remove at least the anomalous seed term associated with the score corresponding to the highest quantity of matching context patterns.

2. The system of claim 1, wherein the score characterizes a quantity of the identified matching content between the constructed context pattern and the seed terms.

3. The system of claim 2, wherein the score calculation comprises the director configured to review a set of terms produced in the constructed pattern, and quantify a match of each term in the set of terms with seed terms in the dictionary.

4. The system of claim 2, further comprising the dictionary manager configured to attach the score to the corresponding seed term as metadata, wherein the metadata represents a degree of ambiguity and/or spuriousness of the seed term with respect to the textual corpus.

5. The system of claim 1, wherein application of NLP to the textual corpus further comprises the dictionary manager configured to randomly select portions of the textual corpus subject to review.

6. The system of claim 1, wherein the selective removal of the one or more anomalous seed terms from the dictionary eliminates anomalous items from the dictionary.

7. The system of claim 1, wherein the processing unit is configured to receive an electronic search request containing a plurality of keywords, identify a keyword of the plurality of keywords that matches the one or more anomalous seed terms, and carry out an electronic search that excludes the keyword matched to the one or more anomalous seed terms.

8. A computer program product for dictionary membership management, the computer program product comprising:
 a computer readable storage medium; and
 program code embodied therewith with the computer readable storage medium, the program code executable by a processor to:
  apply natural language processing (NLP) to a textual corpus, including apply seed terms of a dictionary to the textual corpus and identify one or more matching items in the textual corpus;
  characterize linguistic properties of each matching item in the textual corpus, including construct a context pattern from the textual corpus for each of the identified one or more matching items;
  apply each constructed context pattern to the dictionary;
  identify matching content between the seed terms of the dictionary and content of the context pattern;
  quantify the identified matching content, including assess scores for the seed terms, the score for the seed term representative of a quantity of the context patterns matching the seed term;
  identify one or more anomalous terms from the seed terms of the dictionary, the one or more anomalous seed terms having ambiguous behavior as reflected in the quantification; and
  selectively remove the identified one or more anomalous seed terms from the dictionary, including to selectively remove at least the anomalous seed term associated with the score corresponding to the highest quantity of matching context patterns.

9. The computer program product of claim 8, wherein the score characterizes a quantity of the identified matching content between the constructed context pattern and the seed terms.

10. The computer program product of claim 9, wherein the score calculation comprises program code executable by the processor to review a set of terms produced in the constructed pattern, and quantify a match of each term in the set of terms with seed terms in the dictionary.

11. The computer program product of claim 9, further comprising program code executable by the processor to attach the score to the corresponding seed term as metadata, wherein the metadata represents a degree of ambiguity and/or spuriousness of the seed term with respect to the textual corpus.

12. The computer program product of claim 8, wherein the program code executable by the processor to selectively remove one or more seed terms from the dictionary comprises program code executable by the processor to eliminate anomalous items from the dictionary.

13. The computer program product of claim 8, further comprising the program code executable by the processor to:
 receive an electronic search request containing a plurality of keywords;
 identify a keyword of the plurality of keywords that matches the one or more anomalous seed terms; and
 carry out an electronic search that excludes the keyword matched to the one or more anomalous seed terms.

14. A method comprising:
 applying natural language processing (NLP) to a textual corpus, including applying seed terms of a dictionary to the textual corpus and identifying one or more matching items in the textual corpus;

characterizing linguistic properties for each matching item in the textual corpus, including constructing a context pattern from the textual corpus for each of the identified one or more matching items;

applying each constructed context pattern to the dictionary;

identifying matching content between the seed terms of the dictionary and content of the constructed context pattern corresponding to the seed terms;

quantifying the identified matching content, including assessing scores for the seed terms, the score for the seed term representative of a quantity of the context patterns matching the seed term;

identifying one or more anomalous terms from the seed terms of the dictionary, the one or more anomalous terms having ambiguous behavior as reflected in the quantification; and selectively removing the identified one or more anomalous seed terms from the dictionary, including selectively removing at least the anomalous seed term associated with the score corresponding to the highest quantity of matching context patterns.

15. The method of claim 14, wherein the score characterizes a quantity of the identified matching content between the constructed context pattern and the seed terms.

16. The method of claim 15, wherein calculating the score comprises reviewing a set of terms produced in the constructed pattern and quantifying a match of each term in the set of terms with seed terms in the dictionary.

17. The method of claim 15, further comprising attaching the score to the corresponding seed word as metadata, wherein the metadata represents a degree of ambiguity and/or spuriousness of the seed term with respect to the textual corpus.

18. The method of claim 14, wherein the applying NLP to the textual corpus further comprises randomizing portions of the textual corpus subject to review.

19. The method of claim 14, wherein the selectively removing of the one or more anomalous seed terms from the dictionary eliminates anomalous items from the dictionary.

20. The method of claim 14, further comprising:

receiving an electronic search request containing a plurality of keywords;

identifying a keyword of the plurality of keywords that matches the one or more anomalous seed terms; and carrying out an electronic search that excludes the keyword matched to the one or more anomalous seed terms.

* * * * *